(12) United States Patent
Shiraishi

(10) Patent No.: US 8,620,910 B2
(45) Date of Patent: Dec. 31, 2013

(54) SEARCH SYSTEM, SEARCH METHOD, AND PROGRAM

(75) Inventor: Nobuhisa Shiraishi, Tokyo (JP)

(73) Assignee: NEC Corporation, Tokyo (JP)

( * ) Notice: Subject to any disclaimer, the term of this patent is extended or adjusted under 35 U.S.C. 154(b) by 264 days.

(21) Appl. No.: 12/919,075

(22) PCT Filed: Feb. 25, 2009

(86) PCT No.: PCT/JP2009/053349
§ 371 (c)(1),
(2), (4) Date: Aug. 24, 2010

(87) PCT Pub. No.: WO2009/107628
PCT Pub. Date: Sep. 3, 2009

(65) Prior Publication Data
US 2011/0004592 A1     Jan. 6, 2011

(30) Foreign Application Priority Data
Feb. 27, 2008   (JP) .................................. 2008-045660

(51) Int. Cl.
*G06F 17/30* (2006.01)
(52) U.S. Cl.
CPC ................. *G06F 17/30017* (2013.01)
USPC .......................................................... 707/728
(58) Field of Classification Search
USPC ........................... 707/728, 730, 748, 750, 770
See application file for complete search history.

(56) References Cited

U.S. PATENT DOCUMENTS 6,370,527 B1 * 4/2002 Singhal .................................. 1/1
7,743,054 B2 * 6/2010 Sasai ............................ 707/721

FOREIGN PATENT DOCUMENTS

| JP | 10-260955 | A | 9/1998 | |
|---|---|---|---|---|
| JP | 11-149478 | A | 6/1999 | |
| JP | 11-212996 | A | 8/1999 | |
| JP | 2002032401 | A | 1/2002 | |
| JP | 2002342366 | A | 11/2002 | |
| JP | 2003132060 | A | 5/2003 | |
| JP | 2004287532 | A | 10/2004 | |
| JP | 2006-331295 | * | 7/2006 | ......... 17/30 |
| JP | 2006331295 | A | 12/2006 | |

OTHER PUBLICATIONS

Daniel E Rose et al., Understanding User Goals in Web Search, May 17-22, 2004, ACM, 13-19.*
International Search Report for PCT/JP2009/053349 mailed Mar. 31, 2009.

* cited by examiner

*Primary Examiner* — Jean B Fleurantin

(57) ABSTRACT

A search system includes a scoring engine weight value database that stores weight value information of each scoring engine corresponding to a plurality of users, a search result response unit that causes weight value information that is stored in the scoring engine weight value database to be reflected in search results that are searched by a search engine and that reflect scores computed by scoring engines to create search results that are presented to a user; and a search result behavior acquisition unit that acquires selection behavior information of a user with respect to search results that are presented and that causes the acquired selection behavior information to be reflected in the scoring engine weight value database.

15 Claims, 10 Drawing Sheets

Fig.8

| keyword identifier | scoring engine identifier | weight value | final update time |
|---|---|---|---|
| keyword α | engine 1 | 1.2 | 2007/12/01 |
| keyword β | engine 1 | 0.8 | 2007/11/01 |
| keyword α | engine 2 | 0.8 | 2007/12/01 |
| keyword β |  | 1.2 | 2007/11/01 |
| ⋮ | ⋮ | ⋮ | ⋮ |

| keyword identifier | category identifier |
|---|---|
| keyword α | category A |
| keyword β | category B |
| keyword γ | category C |
| keyword δ | category D |
| ⋮ | ⋮ |

801 802

SEARCH SYSTEM, SEARCH METHOD, AND PROGRAM

This application is the National Phase of PCT/JP2009/053349, filed Feb. 25, 2009, which is based upon and claims the benefit of priority from Japanese Patent Application No. 2008-045660 filed on Feb. 27, 2008, the content of which is incorporated by reference.

TECHNICAL FIELD

The present invention relates to a search system, a search method, and a program for causing a computer to execute a method for performing a search for object information that does not include sufficient links or characteristic words within the information.

BACKGROUND OF THE INVENTION

One example of a search system is disclosed in JP-A-2002-032401 (hereinbelow referred to as Patent Document 1). As described in paragraphs 0015-0016, the search system disclosed in this document includes user profile information and matching degree information of documents for each individual profile, carries out a computation of scores for each document of the search results based on the profile information of users and matching degree information that the search system holds in advance in addition to the search conditions that are applied as input when the user carries out a search, and, as search results that are arranged in order of higher scores, alters the order within a list of documents.

Another example of a search system is disclosed in JP-A-2006-331295 (hereinbelow referred to as Patent Document 2). As disclosed in paragraphs 0049-0056, the search system disclosed in this document accumulates as operation history the browsing time of Web pages that have been accessed by the user in the past, and at the time a search is carried out, performs a computation of the score of each Web page of the search results and then alters the order of the search results that are arranged in order of higher scores while giving consideration to the operation history.

DETAILED DESCRIPTION OF THE INVENTION

However, in the search system disclosed in Patent Document 1, a user's profile information cannot be automatically generated. In addition, a user's profile information cannot be automatically updated. This inability is due to the system's lack of functions for letting a user register profile information in advance and for automatically generating a user's profile information when generating a user's profile information.

In the search system disclosed in Patent Document 1, moreover, the weighting of scores among a plurality of scoring engines cannot be automatically altered. This is because the score computation algorithms held by a search system for scoring achieved by the matching degree information of documents based on users' profile information or scoring based on users' search history information can be combined only by fixed weighting.

In the search system disclosed in Patent Document 2, a user's operation history is collected and the order of search results that are arranged in the order of higher scores is altered according to the operation history. In this search system, however, the objects reflected in the operation history are limited to Web pages browsed by the user in the past. In other words, a user's profile information (in this example, the operation history) cannot be reflected in Web pages that were not browsed by the user in the past.

An exemplary object of the invention is to provide a search system, a search method, and a program that enable automatic generation of profile information that are widely utilized in the search process and automatic updating of a user's profile information.

A search system according to an exemplary aspect of the invention includes: a search engine that implements a search in accordance with a search condition that is contained in a search request; a plurality of scoring engines that perform computation of scores of a plurality of items of information that result from a search; a search request processor that receives a search request from a user and causes the search engine to execute a search; a scoring engine weight value database that stores weight value information of each scoring engine that corresponds to a plurality of users or a plurality of search conditions; a search result response unit that causes weight value information stored in the scoring engine weight value database to be reflected in search results that are realized by a search by the search engine and that reflect scores computed by the scoring engines to create search results that are presented to a user; and a search result behavior acquisition unit that, when a user performs selection behavior with respect to search results that are presented, updates weight value information that is stored in the scoring engine weight value database in accordance with information based on the selection behavior.

A search method according to an exemplary aspect of the invention includes steps of: upon receiving a search request from a user, causing a search engine to execute a search in accordance with search conditions that are contained in the search request; causing a plurality of scoring engines to compute scores of a plurality of items of information that result from a search; providing a scoring engine weight value database that stores weight value information of each scoring engine that corresponds to a plurality of users or a plurality of search conditions; causing weight value information that is stored in the scoring engine weight value database to be reflected in search results that are realized by a search by the search engine and that reflect scores computed by the scoring engines to create search results that are presented to a user; and acquiring a user's selection behavior information with respect to search results that are presented, and causing the acquired selection behavior information to be reflected in the scoring engine weight value database.

Finally, a program according to an exemplary aspect of the invention is a program for causing a computer to execute processes of: implementing a search by a search engine in accordance with search conditions contained in a search request; computing by a plurality of scoring engines scores of a plurality of items of information that result from a search; generating a scoring engine weight value database that stores weight value information of each scoring engine that corresponds to a plurality of users or a plurality of search conditions; causing weight value information that is stored in the scoring engine weight value database to be reflected in search results that are searched by the search engine and that reflect scores computed by scoring engines to create search results that are presented to the user; and acquiring a user's selection behavior information with respect to search results that are presented and causing the acquired selection behavior information to be reflected in the scoring engine weight value database.

BRIEF DESCRIPTION OF THE DRAWINGS

FIG. 8 is an explanatory view showing an example of data that are stored in the scoring engine weight value DB;

FIG. 9 is an explanatory view showing an example of the data that are stored in a keyword category DB;

Figure 1:
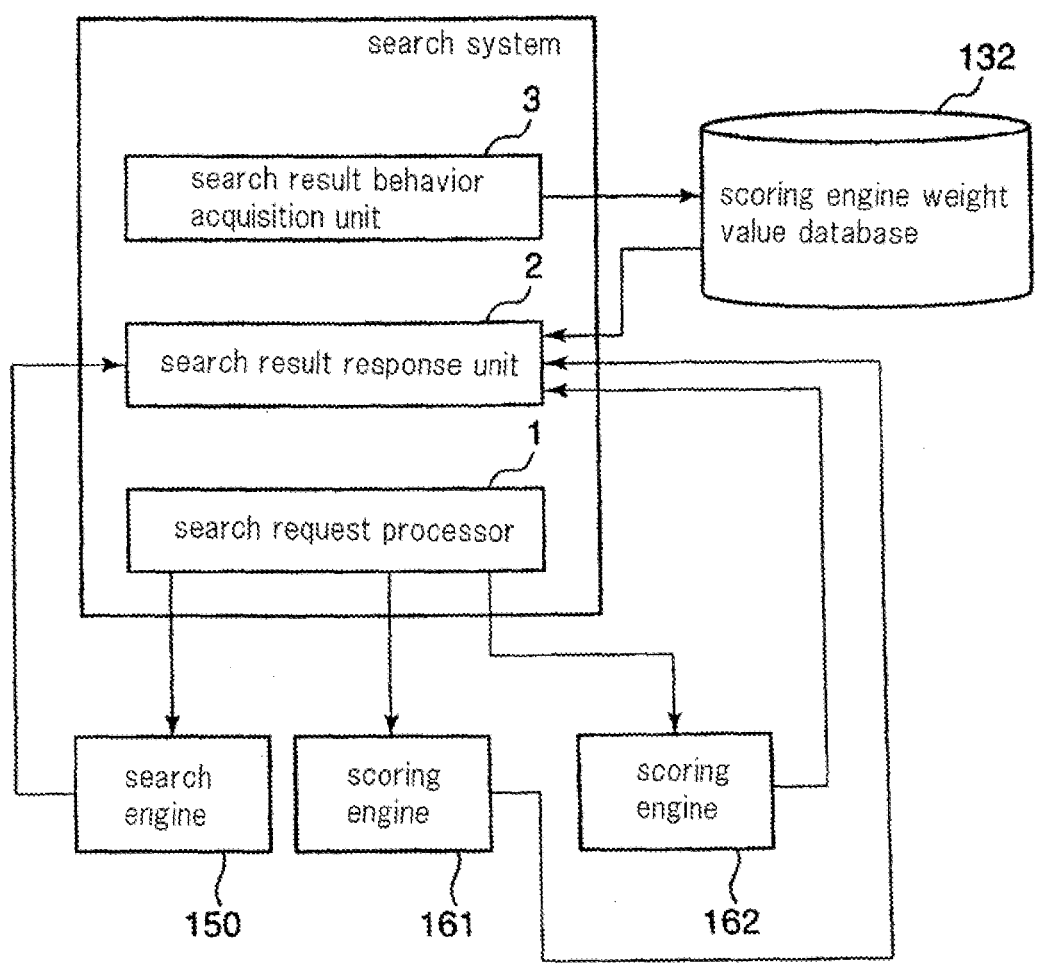
FIG. 1 is a block diagram showing the principal configuration of one exemplary embodiment of the search system according to the present invention.

EXPLANATION OF REFERENCE NUMBERS 1 search request processor
2 search result response unit
3 search result behavior acquisition unit
100 user
110 operation terminal
111 search request input unit
112 search result display unit
120 network
130 search system
131 search result click behavior acquisition unit
132 scoring engine weight value DB
133 keyword category DB
140 search request processor
141 search process control unit
142 search request unit
143 scoring request unit
144 score tabulator
145 scoring engine weight percentage calculation unit
146 search result/score information response unit
150 search engine
151, 152 search engine
161, 162 scoring engine

BEST MODE FOR CARRYING OUT THE INVENTION

FIG. 1 is a block diagram showing the principal configuration of an exemplary embodiment of the search system according to the present invention.

As shown in FIG. 1, the search system according to an exemplary embodiment of the present invention carries out a search of information using search engine 150 that implements a search in accordance with search conditions (such as search keywords) included in a search request and a plurality of scoring engines 161 and 162 that carry out computation of scores of a plurality of items of information of search results. The search system according to an exemplary embodiment of the present invention further includes: search request processor 1 that receives a search request from a user and that causes search engine 150 to execute a search; scoring engine weight value database 132 that stores each of the items of scoring engine weight value information that correspond to a plurality of users or a plurality of conditions for search; search result response unit 2 that causes weight value information that is stored in scoring engine weight value database 132 to be reflected in search results that are searched by search engine 150 and that reflect scores computed by scoring engines 161 and 162 and that create search results that are presented to the user; and search result behavior acquisition unit 3 that acquires selection behavior information of a user with respect to search results that are presented and that causes the acquired selection behavior information to be reflected in scoring engine weight value database 132.

Search request processor 1 corresponds to search process control unit 141 and search request unit 142 shown in FIG. 2 to be explained hereinbelow. The users are, for example, users X and Y shown in FIG. 3 to be described hereinbelow. The conditions for search are, for example, keywords α and β shown in FIG. 8 to be explained hereinbelow.

Figure 2:
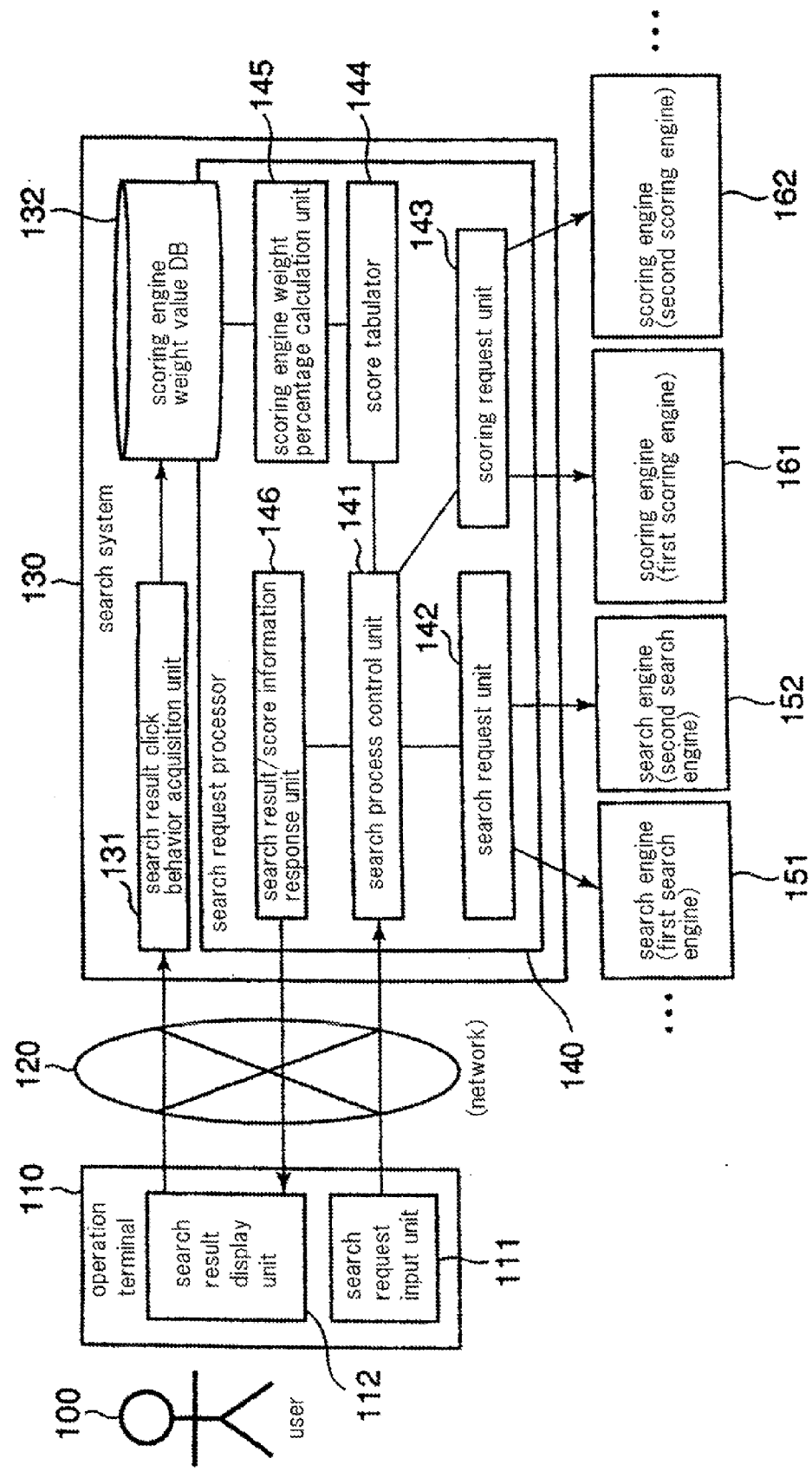
FIG. 2 is a block diagram showing an example of the configuration of the search system in the first exemplary embodiment.
Figure 3:
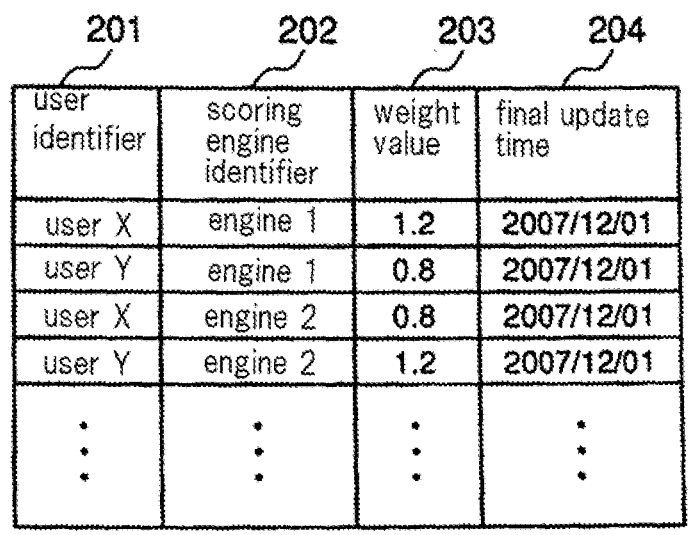
FIG. 3 is an explanatory view showing an example of data that are stored in the scoring weight value DB.

The scoring engine weight value information is, for example, data of weight values shown in FIG. 3 and FIG. 8. Search result response unit 2 corresponds to search result/score information response unit 146 shown in FIG. 2. Search result behavior acquisition unit 3 corresponds to a portion of search result click behavior acquisition unit 131 shown in FIG. 2.

Although a single search engine 150 is shown in FIG. 1, there may also be a plurality of search engines.

In addition, search result behavior acquisition unit 1 may include a weight value attenuation means that, when a user performs selection behavior with respect to search results that are presented, attenuates weight values based on the elapsed time interval from the time at which an entry is updated in the scoring weight value database in accordance with immediately preceding selection behavior of the user up to the present time. The weight value attenuation means corresponds to a portion of search result click behavior acquisition unit 131 shown in FIG. 2.

Exemplary embodiments of the present invention are next described with reference to the accompanying figures.

First Exemplary Embodiment

The configuration of the search system of the first exemplary embodiment is next described. FIG. 2 is a block diagram showing an example of the configuration of the search system in the first exemplary embodiment.

FIG. 2 also shows operation terminal 110 that is communicably connected by way of network (communication network) 120 to search system 130. Operation terminal 110 is a terminal apparatus such as a personal computer and includes search request input unit 111 for user 100 to input a search request and search result display unit 112 that displays search results that are presented to user 100. User 100 enters the search conditions such as search keywords into search request input unit 111. Network 120 is, for example, a LAN or the Internet.

A plurality of search engines (first search engine and second search engine) 151 and 152 that are each means of realizing the search function and a plurality of scoring engines (first scoring engine and second scoring engine) 161 and 162 are connected to search system 130.

As one example, search engines 151 and 152 are each search engines in which the information that is the chief object of search differs. For example, the search engines may be a search engine that corresponds to a business information system and a search engine corresponds to a personnel information system. However, these are only examples for facilitating understanding, and search engines 151 and 152 are not limited to these examples.

As one example, scoring engines 161 and 162 are each scoring engines having different meta-information that is the basis for computing scores. For example, these scoring engines may be a scoring engine that gives higher scores to information having many search keywords, and a scoring engine that gives higher scores to information for which the number of references from a user is high without considering the content percentage of search keywords. However, these scoring engines are only an example to facilitate understanding, and scoring engines 161 and 162 are not limited to these examples.

In addition, each of search engines 151 and 152 is realized by, for example, the execution by a processor such as a CPU (Central Processing Unit) of software for executing a search process. Scoring engines 161 and 162 are realized by, for example, software that computes scores. Although two search engines 151 and 152 and two scoring engines 161 and 162 are connected to the system in FIG. 2, there may also be three or more of each of search engines and scoring engines.

Search system 130 includes search result click behavior acquisition unit 131, scoring engine weight value database (DB) 132, and search request processor 140. Search result click behavior acquisition unit 131 acquires from operation terminal 110 by way of network 120 click behavior information (selection behavior information) by user 100 with respect to the search results displayed on search result display unit 112, and causes this information to be reflected in scoring engine weight value database 132. Scoring engine weight value database 132 stores each item of scoring engine weight value information to be stored for each user.

As one example, search system 130 is realized by a server apparatus in which is installed a CPU that executes processing in accordance with a program. In this case, a database apparatus such as a disk apparatus that stores scoring engine weight value DB 132 may be incorporated in a server apparatus or may be installed outside a server apparatus. Alternatively, search system 130 that is realized by a server apparatus can be considered the search apparatus, and a system that includes the search apparatus and operation terminal 110 can be considered the search system.

Search request processor 140 includes search process control unit 141, search request unit 142, scoring process request unit 143, score tabulator 144, scoring engine weight percentage calculation unit 145, and search result/score information response unit 146. Search process control unit 141 controls the series of search processes in search system 130 in accordance with a search request that is requested from search request input unit 111 of the operation terminal 110. Search request unit 142 submits a request for search to a plurality of search engines 151 and 152 that are connected to search system 130 in accordance with the instructions of search process control unit 141. Scoring process request unit 143 submits a request for scoring to a plurality of scoring engines 161 and 162 that are connected to search system 130 in accordance with instructions of search process control unit 141.

Score tabulator 144 tabulates the scores computed by each of scoring engines 161 and 162 according to weight percentages of each of the scoring engines that were calculated by scoring engine weight percentage calculation unit 145. Scoring engine weight percentage calculation unit 145 calculates the weight percentage of each scoring engine based on the weight value information of each scoring engine that corresponds to each user that is stored in scoring engine weight value DB 132. Search result/score information response unit 146 rearranges the search results according to the scores tabulated by score tabulator 144 and responds to operation terminal 110 with search results that follow rearrangement. In operation terminal 110, the search results are displayed on search result display unit 112.

FIG. 3 is an explanatory view showing an example of data that are stored in scoring engine weight value DB 132. In the example shown in FIG. 3, scoring engine weight value DB 132 includes: user identifier field 201, scoring engine identifier field 202, weight value field 203, and final update time field 204. In FIG. 3, "engine 1" indicates scoring engine 161 (corresponding to the first scoring engine), and "engine 2" indicates scoring engine 162 (corresponding to the second scoring engine).

Data of the user identifier (user ID) are set in user identifier field 201. The identifier of the scoring engine (scoring engine identifier) that corresponds to the user identifier that is set in user identifier field 201 is set in scoring engine identifier field 202. The weight value (scoring engine weight value) that corresponds to the user identifier that is set in user identifier field 201 is set in weight value field 203. The time at which the entry (corresponding to the line in the figure) was set or the time at which the weight value was updated is set in final update time field 204.

The operations of the search system of the present exemplary embodiment are next described with reference to the flow charts of FIG. 4 and FIG. 5.

The operation by search result click behavior acquisition unit 131 of reflecting the weight value information of the scoring engine in scoring weight value DB 132 when user 100 clicks on a document of the search results displayed on search result display unit 112 is first described with reference to the flow chart of FIG. 4.

Score value information computed by each scoring engine for each document of the search results is embedded in the search results displayed to user 100 by search result display unit 112. Search result click behavior acquisition unit 131, upon acquiring click events of the search results of user 100 by way of network 120 (Step S301), acquires the user identifier of the user that clicked and score value information that was computed by each scoring engine for the search results that were clicked (Step S302). As an example, user 100 carries out a log-in operation upon receiving the search system service. In this case, search result click behavior acquisition unit 131 identifies the user identifier from the user ID that is received as input at the time of the log-in operation. Alternatively, search result click behavior acquisition unit 131 may identify the user identifier from the IP address.

Search result click behavior acquisition unit 131 searches entries of the corresponding user identifier and scoring engines in scoring weight value database 132 (Step S303). If corresponding entries exist in scoring weight value database 132, search result click behavior acquisition unit 131 attenuates the weight value based on the elapsed time from the time of the final update of the entry until the current time (Step S304). If there are no corresponding entries in scoring weight value database 132, search result click behavior acquisition unit 131 creates corresponding entries in scoring weight value database 132 (Step S305). In other words, combinations of the user identifier and the identifiers of all scoring engines that exist in the search system are set in scoring weight value database 132.

Search result click behavior acquisition unit 131 then adds to the entries the score values that were computed by each scoring engine for the search result document that was clicked as the weight values of the scoring engines for that user (Step S306). Finally, the final update time of that entry is set to the current time (Step S307).

The operations of search system 130 when user 100 applies search keywords as input to search request input unit 111 and submits a search request are next described with reference to the flow chart of FIG. 5.

Search process control unit 141 in search request processor 140 in search system 130, upon receiving a search request from search request input unit 111 in operation terminal 110 by way of network 120, acquires the search keywords and the user identifier of the user that requested the search based on the search request information (Step S401). Search process control unit 141 delivers the search keywords and user identifier to search request unit 142 and requests that a search be executed. In accordance with the instructions, search request unit 142 uses the search keywords to submit a request for search to each of search engines 151 and 152 (Step S402).

When each of search engines 151 and 152 are search engines that carry out search of stored documents, search engines 151 and 152 carry out a document search from the document database (not shown) based on the search keywords. The search results are then supplied to search request unit 142. Alternatively, a Web browser may be used as search engines 151 and 152.

When the search results are supplied as output, search process control unit 141 issues instructions to scoring request unit 143 to execute a process of computing score values. In accordance with the instructions, scoring request unit 143 issues requests for the computation of score values to each of scoring engines 161 and 162 for the search results that search request unit 142 received from each search engine (Step S403). In accordance with the request, scoring engines 161 and 162 compute score values.

Scoring engine weight percentage calculation unit 145 selects all scoring engine weight information entries relating to the user from scoring engine weight value DB 132 (Step S404).

Scoring engine weight percentage calculation unit 145 adds the weight values of all scoring engines relating to the user and computes the total scoring engine weight value of that user (Step S405). Scoring engine weight percentage calculation unit 145 then divides the weight value of each scoring engine by the total scoring weight value of that user to compute the weight percentage of each scoring engine for that user (Step S406).

Finally, score tabulator 144 computes the scores of documents of the search results according to the score values computed by each of scoring engines 161 and 162 and the weight percentages that were computed by scoring engine weight percentage calculation unit 145 and rearranges the search results according to the scores of the documents. In other words, score tabulator 144 takes the scores of documents of the search results as "score 1 realized by scoring engine 161×the weight percentage of the first scoring engine+ score 2 realized by scoring engine 162×weight percentage of the second scoring engine" and rearranges the search results in the order of higher scores. Search result/score information response unit 146 then transmits the search results to search result display unit 112 and the search results are presented to the user (Step S407).

An actual example of the scoring engine weight value computation algorithm in the operation of the present exemplary embodiment is described with reference to the explanatory view of FIG. 6.

Figure 6:
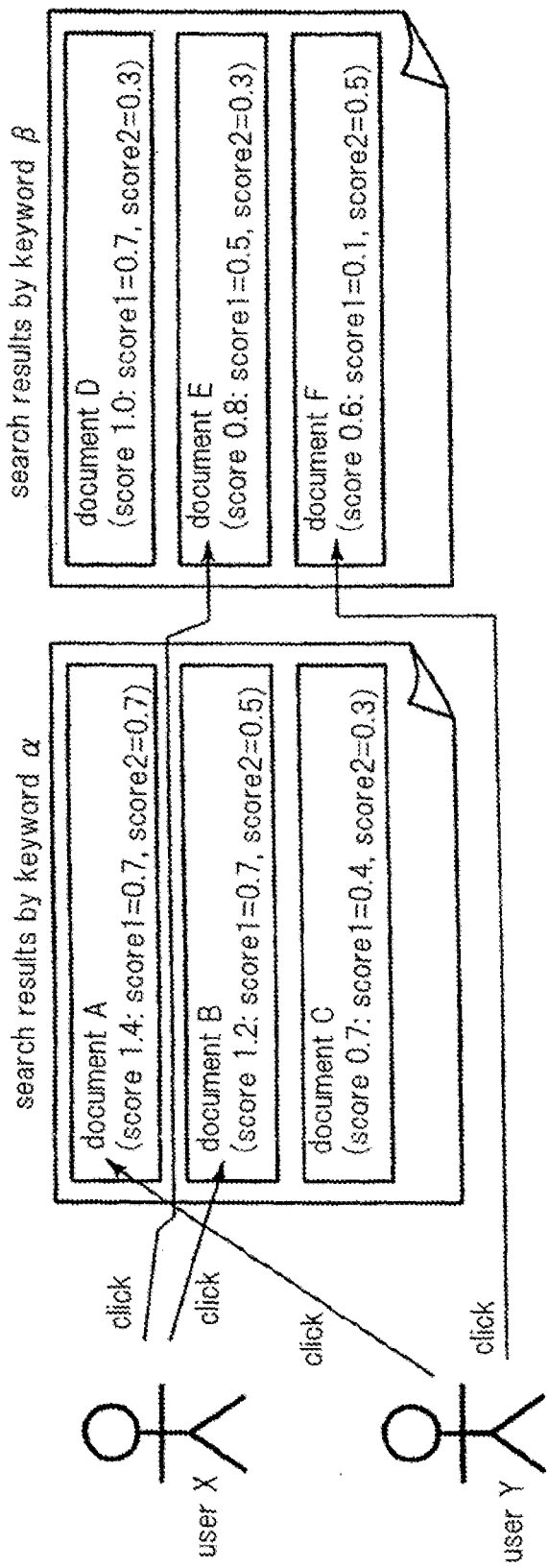
FIG. 6 is an explanatory view for explaining an actual example of a scoring engine weight value computation algorithm.

It is first assumed that, as shown in FIG. 6, user X and user Y each search by keyword α and click on search results and then search by keyword β and click on the search results.

If document B is contained in the search results presented in the process of Step S407, when user X clicks on document B of the search results that were searched by keyword α, the scores relating to the score value of document B are 0.7 for score 1 realized by scoring engine 161 and 0.5 for score 2 realized by scoring engine 162, resulting in an overall score value of 1.2 for document B. The scoring engine weight percentage relating to user X at this time is 0.7/1.2=0.58 for the first scoring engine weight percentage and 0.5/1.2=0.42 for the second scoring engine weight percentage.

If document A is contained in the search results presented in the process of Step S407, when user Y clicks on document A of the search results that were searched by keyword α, the scores relating to the score value of document A are 0.7 for score 1 realized by scoring engine 161 and 0.7 for score 2 realized by scoring engine 162, resulting in an overall score value of 1.4 for document A. The weight percentages of the scoring engines relating to user Y at this time are 0.7/1.4=0.5 for the weight percentage of the first scoring engine and 0.7/1.4=0.5 for the weight percentage of the second scoring engine.

If document E is contained in the search results presented in the process of Step S407, when user X clicks on document E of the search results that were searched by keyword β, the scores relating to the score value of document E are 0.5 for score 1 realized by scoring engine 161 and 0.3 for score 2 realized by scoring engine 162 for an overall score value of 0.8 for document B. If the scoring engine weight value attenuation percentage from clicking on document B of the search results searched by keyword α until clicking on document E of the search results searched by keyword β is taken as 0.8, the scoring engine weight percentages relating to user X at this time are 0.58×0.8+0.5/0.8=1.09 for the weight percentage of the first scoring engine and 0.42×0.8+0.3/0.8=0.71 for the weight percentage of the second scoring engine.

Figure 4:
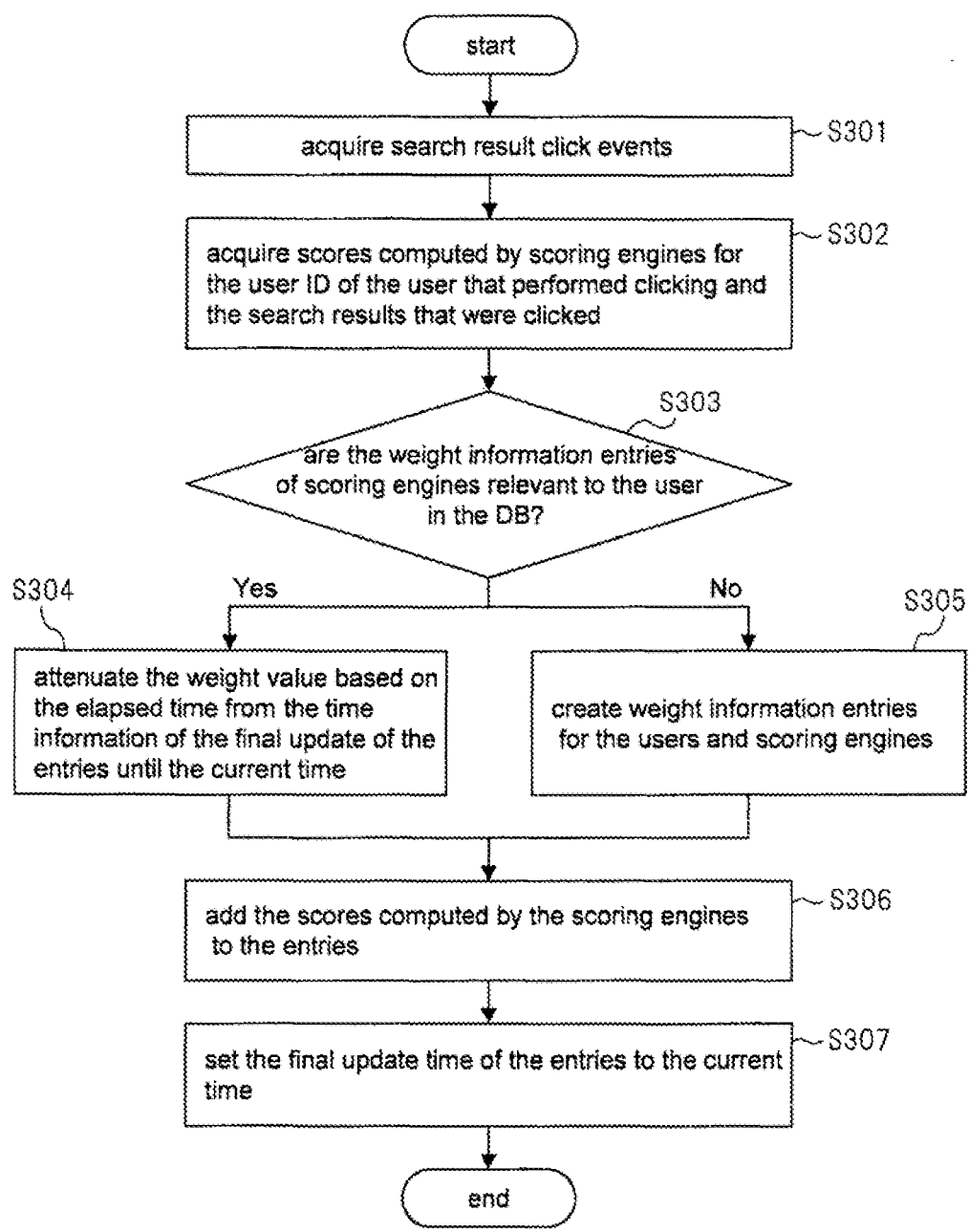
FIG. 4 is a flow chart showing the operation of reflecting the weight value information of scoring engines in the scoring weight value DB by the search result click behavior acquisition unit in the first exemplary embodiment.
Figure 5:
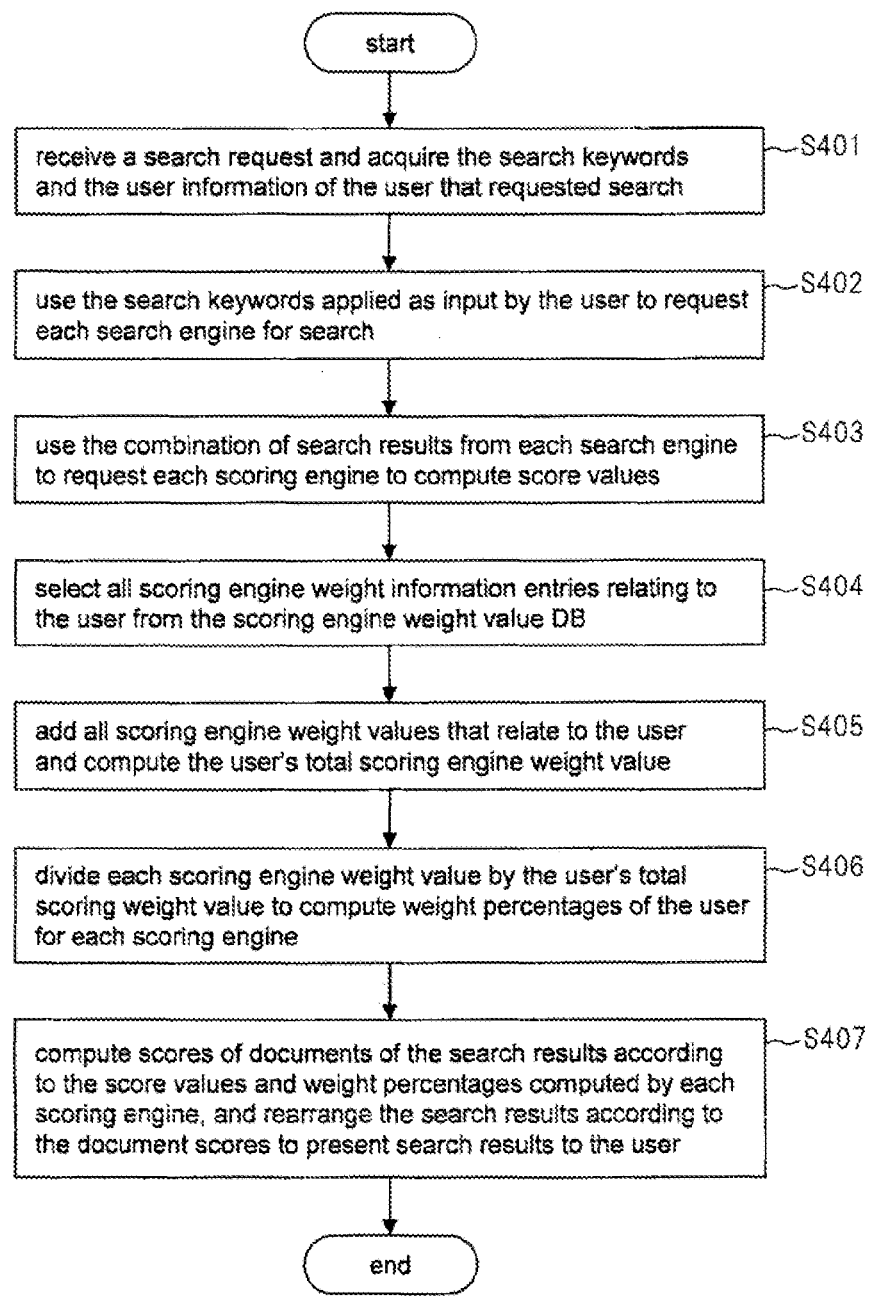
FIG. 5 is a flow chart showing the operation of the search system when carrying out a user search request in the first exemplary embodiment.

The scoring engine weight values are attenuated by the process of Step S304 shown in FIG. 4. In addition, as an example, a case is considered in which the attenuation percentage is 0.9 for an elapsed time interval of one week.

If document F is contained in the search results presented in the process of Step S407, when user Y clicks on document F of the search results that were searched by keyword β, the score values of document F are 0.1 for score 1 realized by scoring engine 161 and 0.5 for score 2 realized by scoring engine 162 for an overall score value of 0.6 for document A. Assuming that the scoring engine weight value attenuation percentage is 0.8 from clicking on document A of the search results that were searched by keyword α until clicking on document F of the search results that were searched by keyword β, the scoring engine weight percentages relating to user Y at this time are 0.5×0.8+0.1/0.6=0.57 for the weight percentage of the first scoring engine, and 0.5×0.8+0.5/0.6=1.23 for the weight percentage of the second scoring engine.

In the present exemplary embodiment as described hereinabove, search result click behavior acquisition unit 131 generates and updates scoring engine weight information for each user by means of a user's search click behavior, whereby the scoring engine weight information for each user, which is user profile information, is generated and updated automatically.

Further, in the present exemplary embodiment, scoring process request unit 143 and score tabulator 144 are provided separately from scoring engines 161 and 162, whereby a plurality of scoring engines can be easily added.

Still further, the provision of scoring engine weight percentage calculation unit 144, scoring engine weight value DB 132, and search result click behavior acquisition unit 131 enables the automatic generation and updating of scoring engine weight information that corresponds to each user based on the user's search result click behavior information and enables determination of scoring engine weight percentages for each user by means of the scoring engine weight information.

Second Exemplary Embodiment

Figure 7:
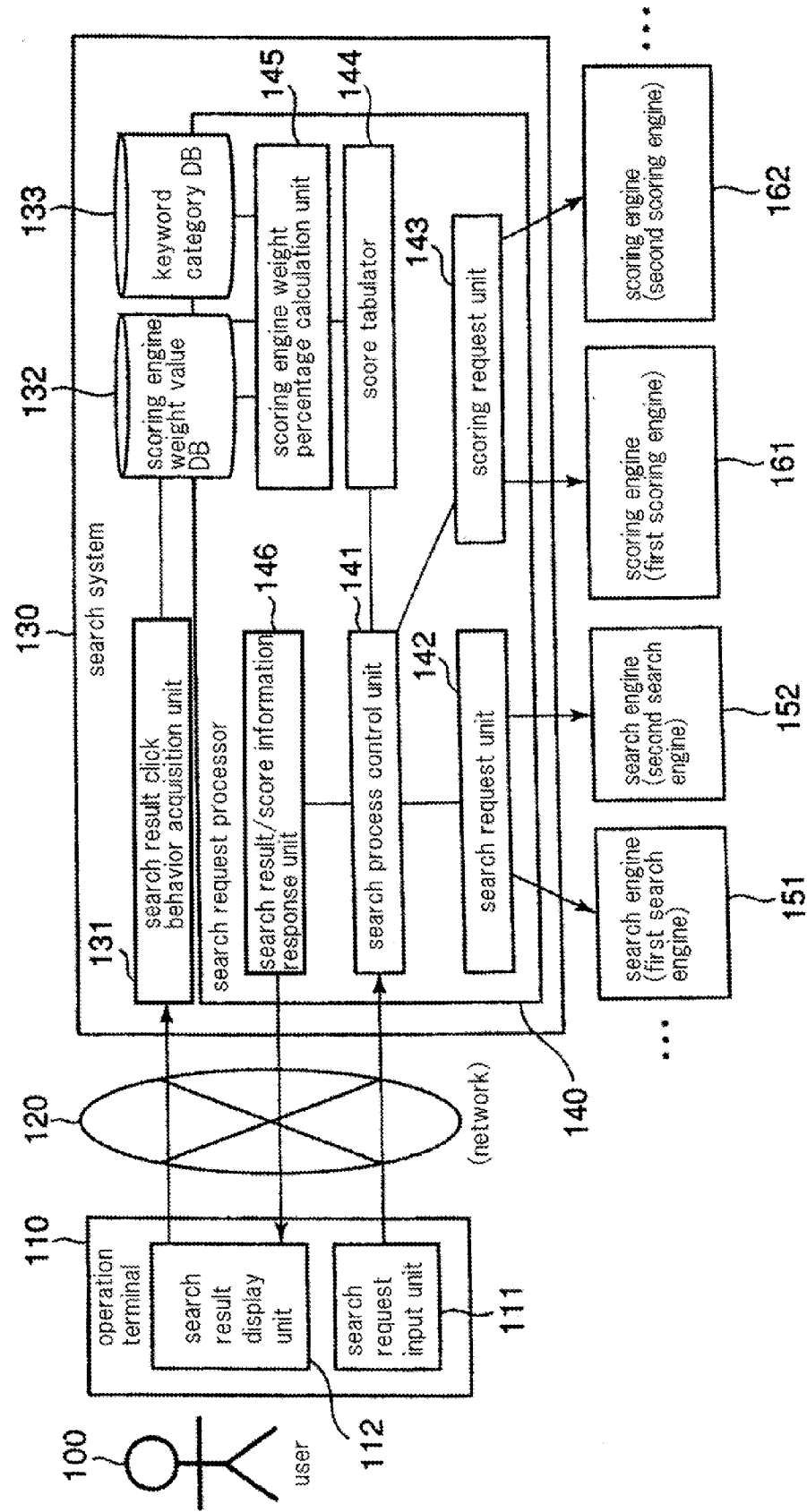
FIG. 7 is a block diagram showing an example of the configuration of the search system in the second exemplary embodiment.

The configuration of the search system of the second exemplary embodiment is next described. FIG. 7 is a block diagram showing an example of the configuration of the search system in the second exemplary embodiment.

The search system of the second exemplary embodiment is provided with keyword category DB 133 in addition to the configuration of the first exemplary embodiment. In the present exemplary embodiment, scoring engine weight value DB 132 stores weight value information of each scoring engine for each keyword. Keyword category DB 133 stores correspondence information of keywords and categories. Examples of categories that can be offered include "keywords relating to technical field," "keywords relating to business/client information," and "keywords relating to in-house procedures." However, these categories are only examples.

FIG. 8 is an explanatory view showing an example of data that are stored in scoring engine weight value DB 132 in the second exemplary embodiment. In the example shown in FIG. 8, user identifier field 701, scoring engine identifier field 702, weight value field 703, and final update time field 704 are included in scoring engine weight value DB 132. In FIG. 8, "engine 1" indicates scoring engine 161 (corresponding to the first scoring engine), and "engine 2" indicates scoring engine 162 (corresponding to the second scoring engine).

FIG. 9 is an explanatory view showing an example of data that are stored in keyword category DB 133. In the example shown in FIG. 9, keyword field 801 and category field 802 are included in keyword category DB 133.

Figure 10:
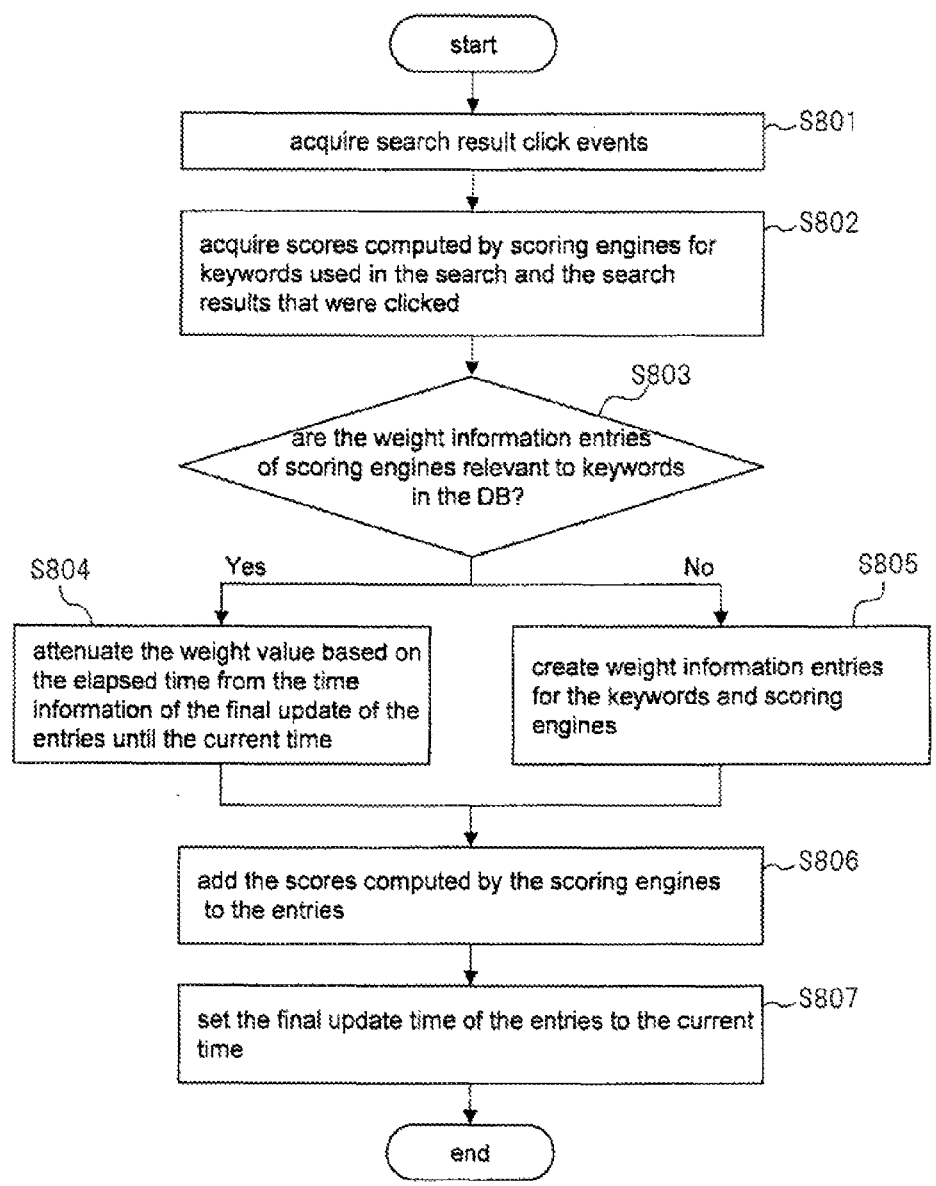
FIG. 10 is a flow chart showing the operation of reflecting the scoring engine weight value information in the scoring weight value DB by the search result click behavior acquisition unit in the second exemplary embodiment.
Figure 11:
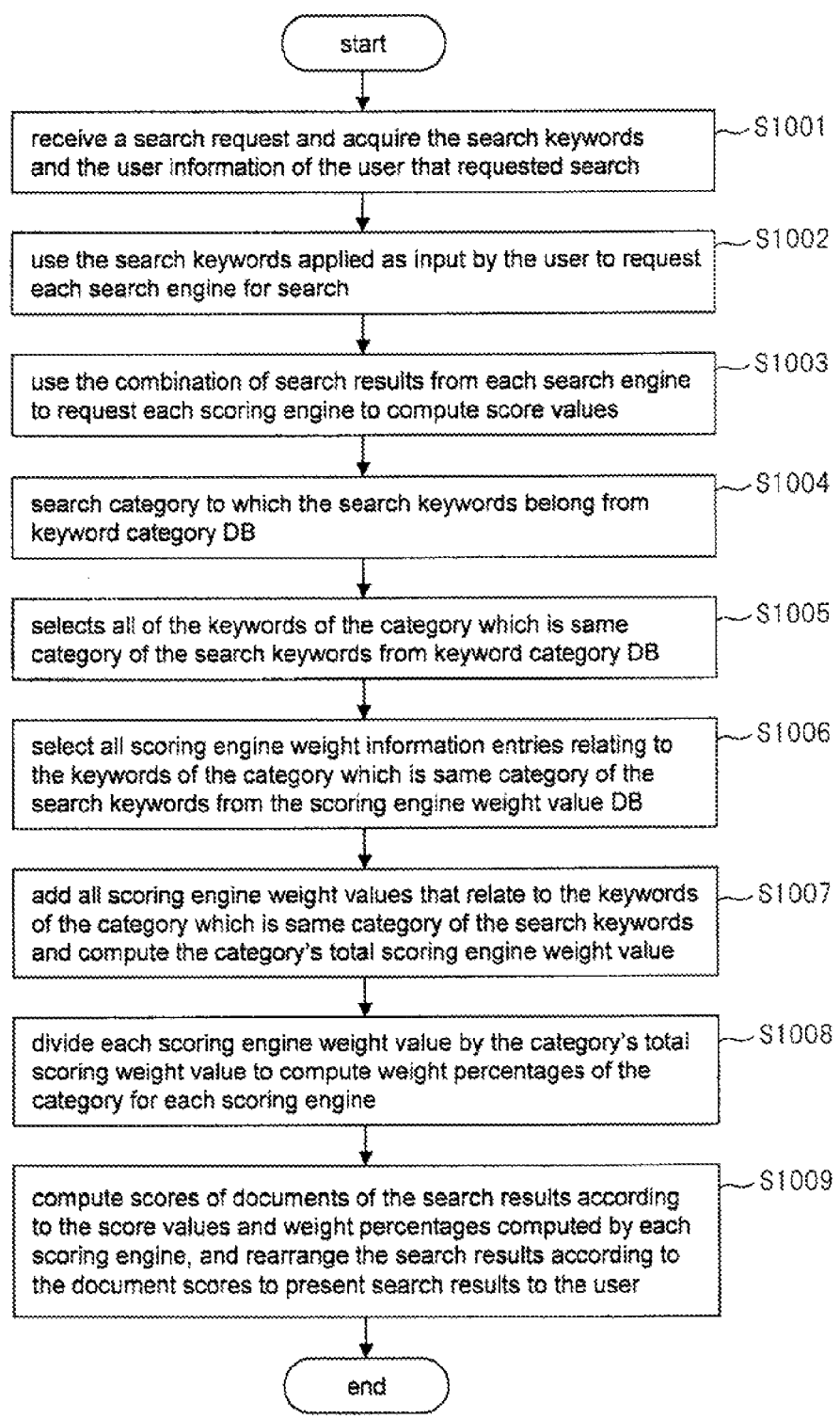
FIG. 11 is a flow chart showing the operation of the search system when carrying out a user search request in the second exemplary embodiment.

The operations of the search system of the present exemplary embodiment are next described with reference to the flow charts of FIG. 10 and FIG. 11.

The operation by which search result click behavior acquisition unit 131 reflects the weight value information of scoring engines in scoring weight value database 132 when user 100 clicks on a document of the search results displayed by search result display unit 112 is next described with reference to the flow chart of FIG. 10.

The search results that search result display unit 112 displays to user 100 include score value information computed by each scoring engine for each document of the search results. Search result click behavior acquisition unit 131, upon acquiring by way of network 120 click events of the search results of user 100 (Step S801), acquires score value information computed by each scoring engine for keywords used in the search and search results that were clicked (Step S802).

Search result click behavior acquisition unit 131 searches entries of relevant keywords and scoring engines from scoring weight value DB 132 (Step S803). If a relevant entry exists in scoring weight value DB 132, search result click behavior acquisition unit 131 attenuates the weight value based on the elapsed time interval from the final update time of the relevant entry until the current time (Step S804). If there are no relevant entries in scoring weight value DB 132, search result click behavior acquisition unit 131 creates relevant entries in scoring weight value DB 132 (Step S805). In other words, combinations of keywords and the identifiers of all scoring engines that exist in the search system are set in scoring weight value DB 132.

Search result click behavior acquisition unit 131 then adds the score values computed by each scoring engine for documents of the search results that were clicked to the entries as the weight values of the scoring engines with respect to the keywords (Step S806). Finally, search result click behavior acquisition unit 131 sets the final update time of the entries to the current time (Step S807).

The operations of search system 130 when user 100 enters search keywords to search request input unit 111 to carry out a search request are next described with reference to the flow chart of FIG. 11.

Search process control unit 141 in search request processor 140 in search system 130, upon receiving a search request by way of network 120 from search request input unit 111 in operation terminal 110, acquires the search keywords and the user identifier of the user that requested the search from the search request information (Step S1001). Search process control unit 141 delivers the search keywords and user identifier to search request unit 142 and requests that a search be executed. In accordance with the instructions, search request unit 142 uses the search keywords to submit a request for search to each of search engines 151 and 152 (Step S1002).

When each of search engines 151 and 152 are search engines that carry out search of accumulated documents, search engines 151 and 152 carry out document search from a document database (not shown) based on the search keywords. The search results are then supplied as output to search request unit 142. Alternatively, a Web browser may be used as search engines 151 and 152.

When the search results are supplied, search process control unit 141 instructs scoring request unit 143 to execute a process for computing the score values. In accordance with the instructions, scoring request unit 143 uses a combination of the search results that search request unit 142 received from each search engine to request the computation of score values to each of scoring engines 161 and 162 (Step S1003). In accordance with the request, scoring engines 161 and 162 compute score values.

Scoring engine weight percentage calculation unit 145 searches categories to which the search keywords belong from keyword category DB 132 (Step S1004). Scoring engine weight percentage calculation unit 145 then selects all of the keywords of the categories (same categories) to which the search keywords belong from keyword category DB 132 (Step S1005). Scoring engine weight percentage calculation unit 145 selects all of the scoring engine weight information entries that relate to keywords of the categories to which the search keywords belong from scoring engine weight value DB 132 (Step S1006).

Scoring engine weight percentage calculation unit 145 adds the weight values of all of the scoring engines that relate to the keywords of the categories to which the search keywords belong and computes the total scoring engine weight value of the categories (Step S1007). Scoring engine weight percentage calculation unit 145 divides the weight value of each scoring engine by the total scoring weight value of the categories and, relating to the search keywords, computes the weight percentages in the same categories of each scoring engine (Step S1008).

Finally, in accordance with the score values computed by each of scoring engines 161 and 162 and the weight percentages computed by scoring engine weight percentage calculation unit 145, score tabulator 144 computes the scores of documents of the search results and rearranges the search results according to the document scores. Search result/score information response unit 146 then transmits the search results to search result display unit 112 and the search results are presented to the user (Step S1009).

An actual example of the scoring engine weight value computation algorithm in the operations of the second exemplary embodiment is next described. In the second exemplary embodiment as well, a case is presented of the selections by users X and Y shown in FIG. 6.

As shown in FIG. 6, it is assumed that user X and user Y each execute a search by keyword α and then click on the search results, following which they execute a search by keyword β and click on the search results.

When user X clicks on document B of the search results that were searched by keyword α and user Y clicks on document A of the search results searched by keyword α, the scores relating to the score value of document B are 0.7 for score 1 realized by scoring engine 161 and 0.5 for score 2 realized by scoring engine 162, resulting in an overall score value of 1.2 for document B. The scores relating to the score value for document A are 0.7 for score 1 realized by scoring engine 161 and 0.7 for score 2 realized by scoring engine 162, resulting in an overall score value of 1.4 for document A. The scoring engine weight percentages relating to keyword α at this time are 0.7/1.2+0.7/1.4=1.08 for the weight percentage of the first scoring engine and 0.5/1.2+0.7/1.4=0.92 for the weight percentage of the second scoring engine.

When user X subsequently clicks on document E of search results that were searched by keyword β and user Y clicks on document F of search results that were searched by keyword β, the scores relating to the score value of document B are 0.5 for score 1 realized by scoring engine 161 and 0.3 for score 2 realized by scoring engine 162, resulting in an overall score value of 0.8 for document B. The scores relating to the score values of document F are 0.1 for score 1 realized by scoring engine 161 and 0.5 for score 2 realized by scoring engine 162, resulting in an overall score value of 0.6 for document A. The weight percentages of scoring engines relating to keyword β at this time are 0.5/0.8+0.1/0.6=0.79 for the weight percentage of the first scoring engine and 0.3/0.8+0.5/0.6=1.20 for the weight percentage of the second scoring engine.

In the present exemplary embodiment, search result click behavior acquisition unit 131 generates and updates the weight information of the scoring engines for each keyword by means of the search click behavior of users, whereby weight information of scoring engines for each category of search keyword, which is the profile information for each category of search keyword, can be automatically generated and updated.

Further, the provision of scoring engine weight percentage calculation unit 144, scoring engine weight value DB 132, keyword category DB 133, and search result click behavior acquisition unit 131 in the present exemplary embodiment enables the automatic generation and updating of scoring engine weight information for each category of search keyword based on the search result click behavior information of the user and the determination of scoring engine weight percentages for each category of search keyword by means of the scoring engine weight information.

Although a case was described in the first exemplary embodiment in which the weight values of scoring engines were computed for each user and a case was described in the second exemplary embodiment in which the weight values of scoring engines were computed for each search keyword, these forms may be combined, and thus weight values of scoring engines may be computed and stored for each user, and moreover, for each search keyword, and weight percentages of scoring engines may be further computed for each user, and moreover, for each search keyword.

As an example of the effect of the present invention, the profile information of a user can be automatically generated and updated. In addition, as another example of the effect of the present invention, the weighting of scores of a plurality of scoring engines can be automatically altered.

In the system described in Patent Document 1, a plurality of score computation functions (hereinbelow referred to as "scoring engines") could not be dynamically added. This was because the computation of scores for documents of search results could be carried out only by score computation algorithms that were held by the search system in advance, such as scoring by means of matching degree information of documents based on a user's profile information or scoring based on a user's search history information. In contrast, one example of the effect of the present invention is the ability to dynamically add a plurality of scoring engines as described hereinabove.

While the invention has been particularly shown and described with reference to exemplary embodiments and working examples thereof, the invention is not limited to these embodiments and working examples. It will be understood by those of ordinary skill in the art that various changes in form and details may be made therein without departing from the spirit and scope of the present invention as defined by the claims.

The invention claimed is:

1. A search apparatus comprising:
    hardware, including at least a processor;
    a search engine, implemented at least by the hardware, that implements a search in accordance with a search condition that is contained in a search request;
    a plurality of scoring engines, implemented at least by the hardware, that perform computation of scores of a plurality of items of information that results from a search;
    a search request processor, implemented at least by the hardware, that receives a search request from a user and causes said search engine to execute a search;
    a scoring engine weight value database, implemented at least by the hardware, that stores weight value information of each scoring engine that corresponds to a plurality of users or a plurality of search conditions;
    a search result response unit, implemented at least by the hardware, that causes weight value information stored in said scoring engine weight value database to be reflected in search results that are realized by a search by said search engine and that reflect scores computed by said scoring engines to create search results that are presented to a user; and
    a search result behavior acquisition unit, implemented at least by the hardware, that, when a user performs selection behavior with respect to search results that are presented, updates weight value information that is stored in said scoring engine weight value database in accordance with information based on said selection behavior,
    wherein said search result behavior acquisition unit includes weight value attenuation unit that, when a user performs selection behavior with respect to search results that are presented, attenuates weight value based on an elapsed time interval from the time an entry in a scoring weight value database was updated in accordance with immediately preceding selection behavior of said user until the current time.

2. The search apparatus according to claim 1, wherein said search result behavior acquisition unit, when a user selects information from search results that contain score value information computed by a scoring engine, acquires score value information computed by each scoring engine for a user identifier of said user who made the selection and search results that were selected, searches from said scoring weight value database entries of said user identifier and of scoring engines, and when relevant entries do not exist in said scoring weight value database, creates relevant entries in said scoring weight value database.

3. The search apparatus according to claim 2, wherein said weight value attenuation unit attenuates weight value when a relevant entry exists in said scoring weight value database.

4. The search apparatus according to claim 1, wherein said search result behavior acquisition unit, when a user selects information from search results that contain score value information computed by a scoring engine, acquires score value information that was computed by each scoring engine for a search condition that was used in the search and the search results that were selected, searches from said scoring weight value database entries of said search condition and scoring engines, and when relevant entries do not exist in said scoring weight value database, creates said relevant entries in said scoring weight value database.

5. A search apparatus comprising:
hardware, including at least a processor;
a search engine, implemented at least by the hardware, that implements a search in accordance with a search condition that is contained in a search request;
a plurality of scoring engines, implemented at least by the hardware, that perform computation of scores of a plurality of items of information that results from a search;
a search request processor, implemented at least by the hardware, that receives a search request from a user and causes said search engine to execute a search;
a scoring engine weight value database, implemented at least by the hardware, that stores weight value information of each scoring engine that corresponds to a plurality of users or a plurality of search conditions;
a search result response unit, implemented at least by the hardware, that causes weight value information stored in said scoring engine weight value database to be reflected in search results that are realized by a search by said search engine and that reflect scores computed by said scoring engines to create search results that are presented to a user;
a search result behavior acquisition unit, implemented at least by the hardware, that, when a user performs selection behavior with respect to search results that are presented, updates weight value information that is stored in said scoring engine weight value database in accordance with information based on said selection behavior;
a search request unit that submits a request for a search to a search engine in accordance with a search request from a user;
a scoring request unit that, when said search engine supplies search results, submits requests for scoring to a plurality of scoring engines;
a scoring engine weight percentage calculation unit that, based on each item of scoring engine weight value information that corresponds to each user or each search condition that is stored in said scoring engine weight value database, calculates the weight percentage of each scoring engine;
a score tabulator that tabulates scores computed by each scoring engine in accordance with the weight percentage of each scoring engine realized by said scoring engine weight percentage calculation unit; and
a search result/score information output unit that rearranges search results according to scores tabulated by said score tabulator and supplies the search results.

6. The search apparatus according to claim 5, further provided with:
a search condition category database that stores correspondence information of search conditions and categories to which said search conditions belong;
wherein:
said scoring engine weight percentage calculation unit takes, as the scoring engine weight percentage that corresponds to search conditions, the ratio of the weight value of the search conditions with respect to the sum of the weight values indicated by weight value information relating to all conditions that belong to the same categories as the categories to which belong the search conditions contained in a search request from said search condition category database.

7. The search apparatus according to claim 5, further comprising an operation terminal that includes:
a search request input unit that transmits a search request to a search request processor in accordance with a search condition applied as input by a user; and
a search result presenting unit that receives search results from said search result/score information output unit and presents the search results to the user.

8. A search method of a search apparatus having a plurality of scoring engines comprising steps of:
upon a processor of hardware of the search apparatus receiving a search request from a user, causing a search engine to execute a search in accordance with a search condition that is contained in the search request;
causing, by the processor of the hardware, the plurality of scoring engines to compute scores of a plurality of items of information that result from a search;
providing, by the processor of the hardware, a scoring engine weight value database that stores weight value information of each scoring engine that corresponds to a plurality of users or a plurality of search conditions;
causing, by the processor of the hardware, weight value information that is stored in said scoring engine weight value database to be reflected in search results that are realized by a search by said search engine and that reflect scores computed by said scoring engines to create search results that are presented to users;
acquiring, by the processor of the hardware, a user's selection behavior information with respect to search results that are presented; and causing the acquired selection behavior information to be reflected in said scoring engine weight value database; and
when a user performs selection behavior with respect to search results that are presented, attenuating weight value based on the elapsed time from the time of updating entries in the scoring weight value database in accordance with immediately preceding selection behavior of the user until the current time.

9. The search method according to claim 8, further comprising steps of:
when a user selects information from search results containing score value information computed by scoring engines, acquiring score value information computed by each scoring engine for a user identifier of the user who made the selection and the search results that were selected;

retrieving entries of said user identifier and the scoring engine from the scoring weight value database; and if relevant entries do not exist in said scoring weight value database, creating relevant entries in said scoring weight value database.

10. The search method according to claim 9, further comprising a step of, when a relevant entry exists in said scoring weight value database, attenuating weight value.

11. The search method according to claim 8, further comprising steps of:

when a user selects information from search results that contain score value information computed by scoring engines, acquiring score value information computed by each scoring engine for a search condition that was used in the search and the search results that were selected;

retrieving entries of said search condition and scoring engines from the scoring weight value database; and when relevant entries do not exist in said scoring weight value database, creating the relevant entries in said scoring weight value database.

12. A program product for causing a computer to execute processes of:

implementing a search by search engines in accordance with a search condition that is contained in a search request;

computing scores of a plurality of items of information that result from a search by a plurality of scoring engines;

generating a scoring engine weight value database that stores weight value information of each scoring engine corresponding to a plurality of users or a plurality of search conditions;

causing weight value information that is stored in said scoring engine weight value database to be reflected in search results that are searched by said search engines and that reflect scores computed by said scoring engines to create search results that are presented to a user;

acquiring a user's selection behavior information with respect to search results that are presented and causing the acquired selection behavior information to be reflected in said scoring engine weight value database; and when a user performs selection behavior with respect to search results that are presented, attenuating weight value based on the elapsed time from the time of updating entries in the scoring weight value database according to immediately preceding selection behavior of the user until the current time.

13. The program product according to claim 12, further causing said computer to execute processes of:

when a user selects information from search results that contain score value information computed by a scoring engine, acquiring score value information computed by each scoring engine for a user identifier of the user who made the selection and the search results that were selected;

retrieving entries of said user identifier and scoring engines from the scoring weight value database; and when relevant entries do not exist in said scoring weight value database, creating the relevant entries in said scoring weight value database.

14. The program product according to claim 13, further causing said computer to execute a process of attenuating weight value when relevant entries exist in said scoring weight value database.

15. The program product according to claim 12, further causing said computer to execute processes of:

when a user selects information from search results that contain score value information computed by scoring engines, acquiring score value information computed by each scoring engine for a search condition used in search and search results that were selected;

retrieving entries of said search condition and scoring engines from the scoring weight value database; and when relevant entries do not exist in said scoring weight value database, creating relevant entries in said scoring weight value database.

* * * * *